Sept. 23, 1930.    V. BENDIX    1,776,410
BRAKE OPERATING MEANS
Filed April 27, 1925    3 Sheets-Sheet 1
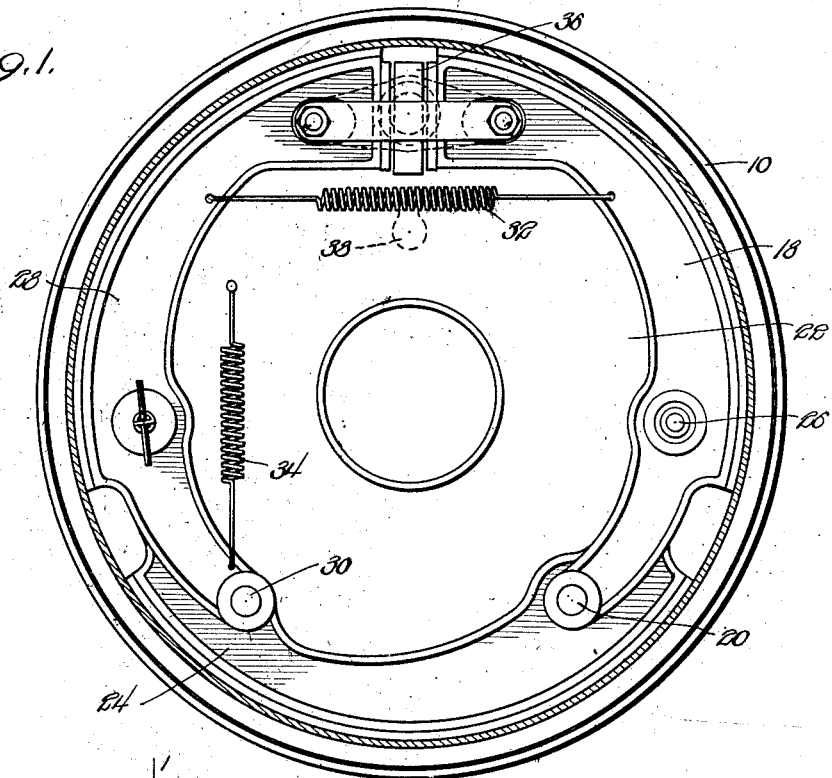
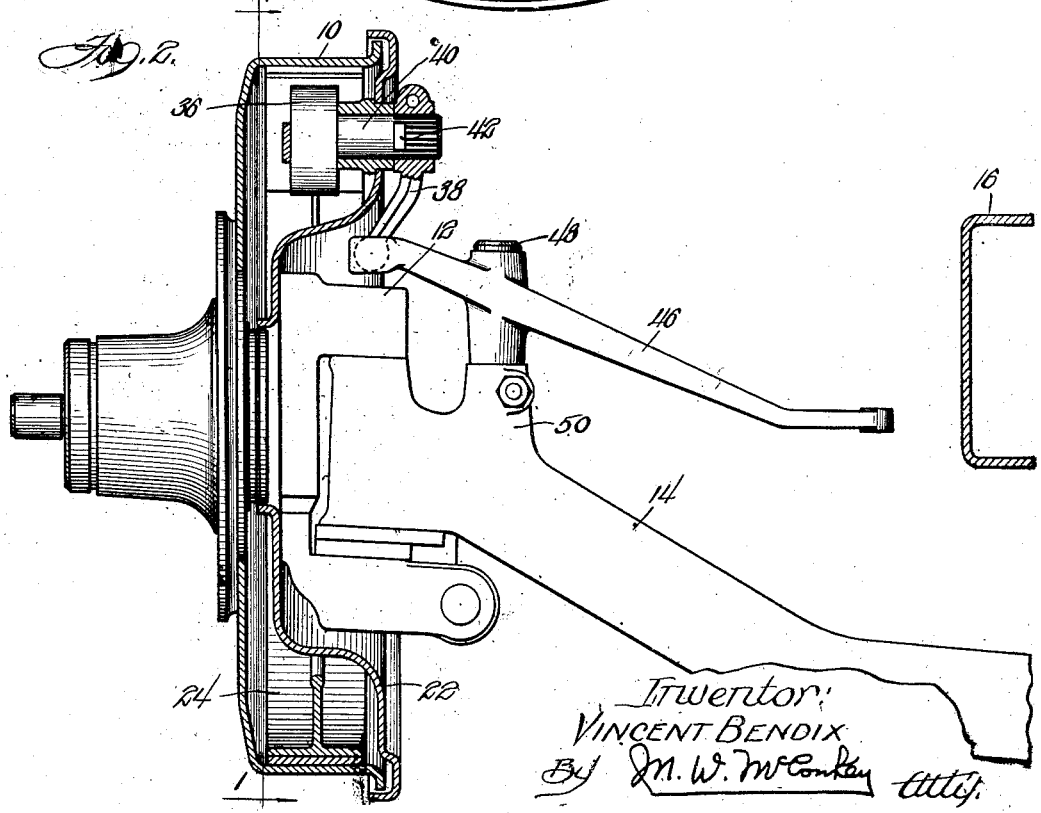
Inventor:
VINCENT BENDIX Sept. 23, 1930.  V. BENDIX  1,776,410
BRAKE OPERATING MEANS
Filed April 27, 1925  3 Sheets-Sheet 2
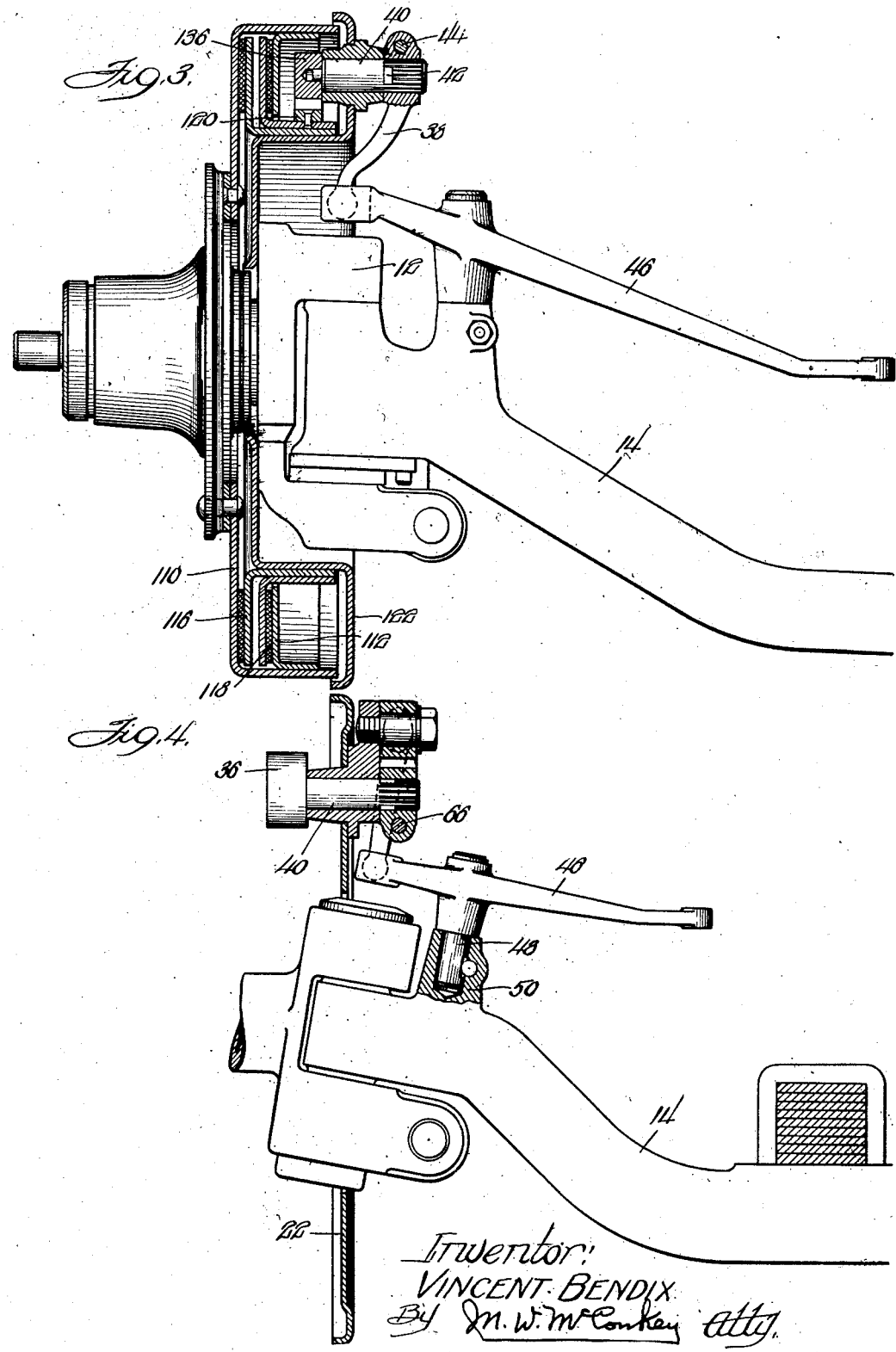

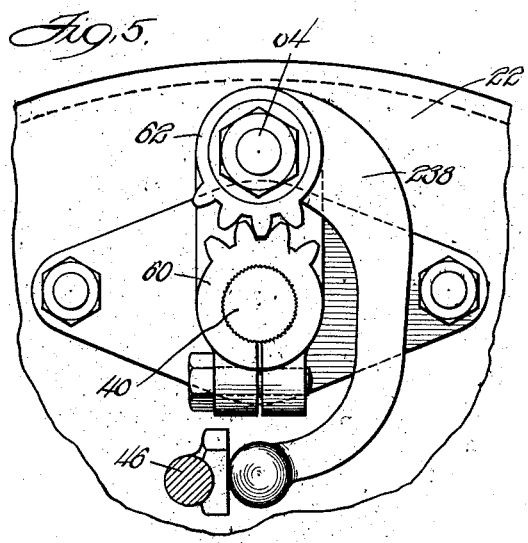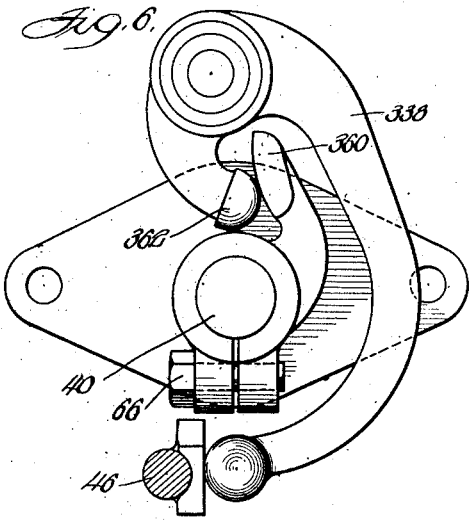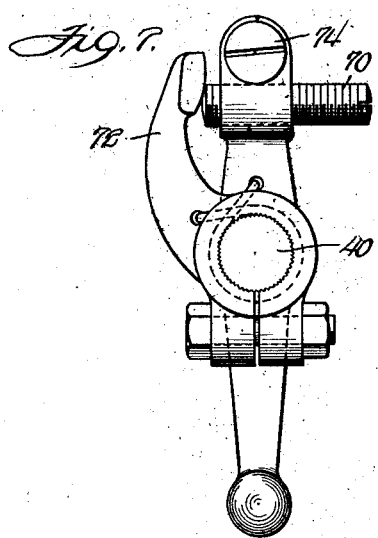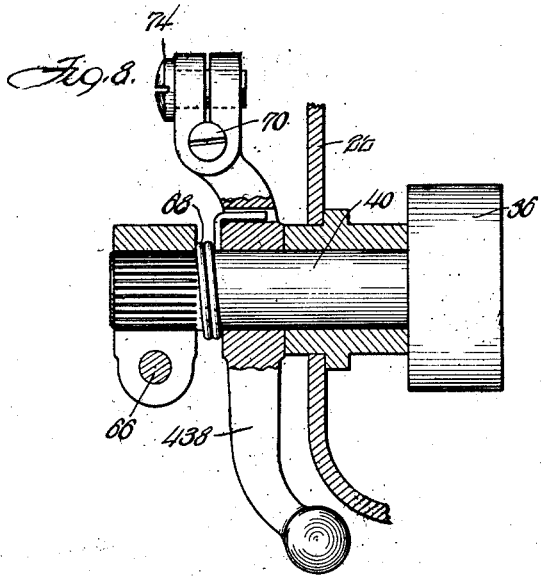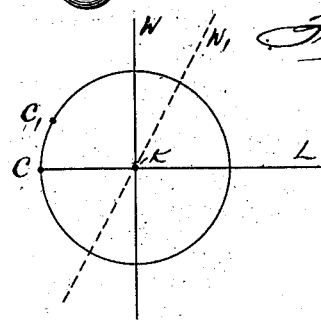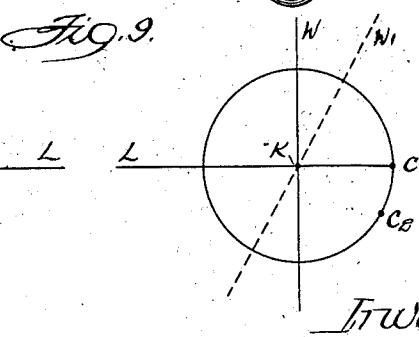

Patented Sept. 23, 1930

1,776,410

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE-OPERATING MEANS

Application filed April 27, 1925. Serial No. 26,036.

This invention relates to operating means for brakes, and is illustrated as embodied in variously modified forms of automobile brake-operating connections; and, while not so limited as to all of its features, the invention is of special importance in operating brakes on front wheels (by which term I mean to include any swivelled wheel). The principal objects of the invention are to secure simple and easily adjustable connections, preferably arranged to vary the action of the brakes on a turn, as by releasing the brake on the outside of the turn.

One important feature of the invention relates to the mounting of an operating arm or other part on the outside of the backing plate, or similar stationary support, where it is readily accessible for adjustment, etc. When used on a front wheel, this part will ordinarily be mounted for movement, preferably generally perpendicular to the swivelling axis, from an idle position outside of that axis to an active position substantially in the axis so that steering movement of the wheel is permitted when the brakes are on. This permits the use of much simpler operating connections than prior constructions in which the movement is along the steering axis.

Another leading feature of the invention relates to the arrangement of operating connections of this general type to vary the action of the brakes on a turn, preferably by releasing the outer brake. From this point of view, and regarding the brake-applying connections as including a part swivelling with the wheel, and movable from an idle position outside the swivelling axis to an active position substantially in that axis, in combination with an operating member, as for example a lever, engaging the movable part to move it to active position, this feature of the invention contemplates arranging the movable part and the operating member so that their junction is spaced slightly at one side of the exact mathematical steering axis, to vary the braking in the desired manner.

When it is desired to release the outer brake the junction would ordinarily come approximately in a plane including the swivelling axis and the wheel axis, slightly at one side of the swivelling axis. Where the operating member is a lever and the outer brake is to be released, this point of engagement would be on the side of the swivelling axis next the wheel.

The above and other objects and features of the invention, including improved particular arrangements permitting the described desired adjustments, and other novel combinations of parts and desirable particular constructions, will be apparent from the following description of the several illustrative embodiments shown in the accompanying drawings, in which:

Figure 1 is a vertical section through one brake just inside the wheel, showing the brake shoes in side elevation;

Figure 2 is a vertical section at right angles to Figure 1 through one front brake and associated parts;

Figure 3 is a view corresponding to Figure 2 but showing the invention embodied in a disc brake;

Figure 4 is a view corresponding to part of Figure 2 but showing modified operating connections;

Figure 5 is a detail elevation looking from the right in Figure 4 and showing the operating connections in end elevation;

Figure 6 is a view corresponding to Figure 5 and showing in end elevation still a different form of operating connections;

Figure 7 is a view corresponding to Figures 5 and 6 and showing in end elevation still a different form of operating connections;

Figure 8 is a partial vertical section showing the parts of Figure 7 partly in side elevation and partly in central section; and Figure 9 is a diagram illustrating a variation of the braking pressure in rounding a corner.

In the arrangement shown in Figures 1 and 2, the invention is illustrated as embodied in operating connections for a brake of the "Bendix" type, including a drum 10 carried by a wheel (not shown), rotatably supported on the spindle of a knuckle 12 swivelled by the usual generally vertical king pin at one end of a front axle 14 which, with the rear axle, supports through the usual springs the chassis frame 16. This particular brake includes a reverse shoe 18, anchored at 20 on a stationary backing plate or other support 22 carried by a knuckle 12, together with a forward shoe 24, anchored at 26 and forced against the drum 10 by an unanchored or servo shoe 28, pivotally connected thereto at 30. Shoes 18 and 28 are urged away from the drum by a spring 32, and an auxiliary spring 34 is provided to hold shoe 24 away from the drum until overcome by circumferential movement of the servo shoe 28. Shoes 18 and 28 are forced against the drum against the resistance of spring 32 by means shown as a double cam 36.

According to one feature of the present invention, the cam 36, or equivalent brake-operating means, is arranged to be operated by a part such as an arm or crank 38, arranged on the outside of the backing plate 22; where it is readily accessible for adjustment, etc. In the particular arrangement illustrated in Figures 1 and 2, the arm 38 is adjustably clamped to the serrated end of a rock shaft 40 journaled in a bearing carried by the backing plate 22 and operating the cam or other brake operating means 36. For convenience in making the necessary adjustments, the shaft 40 is provided with flat surfaces 42, so that it may be turned by an ordinary wrench when the arm 38 has been removed, to force the brake into active or "on" position, whereupon the arm 38 is placed in its correct radial position and slipped over the serrated end of the shaft 40. Thereafter, clamp screw 44, or equivalent holding means, is tightened. This makes a very simple adjustment, as in the illustrated type of operating connections the only position which is of especial importance is the position of the arm 38 or its equivalent when the brake is on.

The arm 38 is shown as rocked to apply the brake by a generally horizontal lever 46 operated in any desired manner by the connections from brake pedal or other operating device. In the arrangement of Figure 2, the lever 46 is pivotally supported by a pin 48 carried by a boss 50 of the axle 14. For convenience of manufacture, the top of the boss 50 is in the same plane with the upper surface of the extremity of the axle, so that they may be machined at the same time, and the bore for the pin 48 is parallel to the bore for the king pin, so that they may be drilled at the same time.

Any suitable type of joint or connection may be utilized between the end of the lever 46 and the lower end of the arm 38. In the particular form shown, the end of the lever 38 is generally spherical and is engaged by a substantially vertical plane surface on the end of the lever 46. Thus the lever 46 may be regarded as pushing the arm 38 forwardly from idle to active position against the resistance of spring 32. It should be particularly noted that the arm 38 or at least that part of it which is engaged by the lever 46, is in its idle position outside of the swivelling axis,—that is, outside of the axis of the king pin. When the brake is applied, the point of engagement between lever 46 and arm 38 moves in a direction generally perpendicular to the swivelling axis to a position substantially in that axis, so that there is no interference with swivelling the wheel in steering the vehicle.

In Figure 3 I have illustrated the use of the above described connections for operating an expansible disc brake. In this arrangement, the drum 110, corresponding to the drum 10, is provided with two substantially vertical surfaces, preferably plane, the left one of which is formed on the drum proper and the right one of which is formed on an annular disc 112, secured to the drum in any desired manner. Between these surfaces are two friction shoes or discs, 116 and 118, corresponding in a general way to the shoes of the brake of Figure 1 and which are arranged to be expanded in opposite directions generally parallel to the axle against the friction surfaces of the drum by pins (not shown) carried by the backing plate 122, and engaging in inclined cam slots in cylindrical or hub sections of the friction discs. The pins are caused to expand the discs as described by turning of the disc 118 by a rack 120 operated by a pinion 136, which corresponds generally to the cam 36 and which is keyed on the end of the rock shaft 40. The details of this particular brake mechanism are more fully described in my prior application No. 726,050, filed July 14, 1924.

In the arrangement of Figures 4 and 5 the cam shaft 40 carries on its serrated end a pinion or the like 60, having teeth meshing with those of a corresponding pinion 62, shown as formed integrally with a curved lever 238, which is mounted on a pivot 64, just above the shaft 40, and which is formed with a spherical end engaged by the end of the lever 46, in the same manner as for arm 38. In adjusting this mechanism, the cam shaft 40 is held by the wrench as described above, while the pinion member 60 is replaced in the correct angular position. The adjustment is preserved by tightening a clamp screw 66.

The arrangement of Figure 6 differs from that of Figure 5 in that the lever 338, corresponding to the lever 238, is formed with a generally spherical end portion 362 engaging a lever 360 on one end of the cam shaft 40. The parts 360 and 362 form equivalents of the pinions 60 and 62.

In Figures 7 and 8 is shown still a different mechanism including a lever 438, loosely sleeved on the cam shaft 40 and urged by a torsion spring 68 in a direction to force an adjustable set screw 70 against the arm 72 clamped upon the serrated end of the cam shaft 40. Adjustments of the set screw 70 may be preserved by tightening a clamp screw 74.

Figure 9 illustrates how any of the above described mechanisms or their equivalents may be arranged to vary the action of the brakes in rounding a corner, preferably by releasing the brake which is on the outside of the turn. In this diagram the solid lines W represent the wheels when in the position they occupy when the car is moving straight ahead, or at least they are parallel to the wheels although diagrammatically shown as intersecting the king pins K. The dotted lines W' indicte the positions of the wheels when they have been swivelled about the king pins K to turn to the right. When the brakes are applied while the wheels are in the positions W the levers 46 will occupy the positions indicated in the diagram by the lines L. The points of engagement of the levers 46 for the two wheels with the arms 38 at this time are indicated by the letters C. When the wheels are turned to the positions W', the point C for the left-hand wheel,—that is, the end of lever 38,—swivels with the wheel and moves to some new position indicated as point C¹. At the same time, the point C for the right wheel,—that is, the end of its lever 38,—tends to move to a corresponding position indicated as C².

Obviously the position of the point C¹ shows that the left-hand arm 38 moves away from its lever 46 and releases the left or outer brake; at the same time right-hand arm 38 is attempting to move to the position C² and is therefore crowding against its lever 46 to tighten the inner brake. It will be recognized, of course, that in using these operating connections to release the outer brake they should not be equalized. It will also be recognized that the lines W and W' do not indicate the exact position of the planes of the wheels, which are not coincident with the axis of the king pin but may be so regarded for the purpose of the diagram. As a matter of fact, the wheels are some distance outside of the king pins, although the axis of the king pin is usually arranged to intersect the plane of its wheel at the ground, and consequently the points C are between king pin axes and the wheels.

While several illustrative embodiments of the invention have been described in detail, it is not my intention to limit its scope to those particular embodiments or otherwise than by the terms of the appended claims. I intend such terms as "drum" and "lever" to be construed as convenient generic terms and not as descriptive of the particular constructions shown in the drawing.

I claim:

1. Front wheel brake mechanism comprising, in combination, a swivelled steering knuckle and a drum rotatably mounted on the knuckle, a support swivelling with the knuckle, a brake-applying shaft carried by the support, means between the support and drum operated by the shaft for applying a friction device, connections on the opposite side of the support from said means for rocking the shaft including a part movable from an idle position outside of the swivelling axis to a position substantially in said axis, and means not swivelling with the knuckle and arranged to move said part from its idle position to its active position to apply the brake.

2. Front wheel brake mechanism comprising, in combination, a swivelled steering knuckle rotatably supporting a drum and carrying a stationary support, means between the support and the drum for applying a friction device, a connection passing through the support and arranged to operate said means, a member on the opposite side of the support from said means movable from an idle position outside of the swivelling axis to an active position in which a part is substantially in said axis, and means for rocking said member from its idle position to its active position by engaging said part to apply the brake.

3. Front wheel brake-operating mechanism comprising, in combination, a swivelled knuckle rotatably supporting a drum and carrying a stationary support, means between the support and the drum for applying a friction device, an arm arranged to rock a brake applying shaft and mounted on the opposite side of the support from said means and arranged to be moved from an idle position outside of the swiveling axis to an active position in which a part is substantially in said axis, and a separately supported operating connection engaging said part of the arm to move it from idle to active position.

4. Front wheel brake-operating mechanism comprising, in combination, a swivelled knuckle rotatably supporting a drum and carrying a stationary support, brake-applying means between the support and drum, a shaft passing through the support and arranged to operate said means, an arm on the opposite side of the support from said means arranged to rock the shaft and movable in a plane approximately parallel to the wheel to move a part substantially horizontally from an idle position outside of the swivelling axis to an active position substantially in said axis, and an operating device engaging said part and arranged to move it from idle to active position.

5. Front wheel brake-operating mechanism comprising, in combination, an axis having a knuckle swivelled at its end, a drum rotatably mounted on the knuckle and a stationary support carried by the knuckle, brake-applying means carried by the support, an arm on the opposite side of the support from the drum arranged to operate said means and mounted to be swung from an idle position outside of the axis about which the knuckle swivels to a position in which a part is substantially in said axis, and a lever fulcrumed on the axle and engaging said part of the arm to rock the arm from idle to active position with the point of engagement between the lever and arm in active position substantially in the swivelling axis.

6. Front wheel brake mechanism, comprising, in combination, a knuckle rotatably supporting a drum and carrying a stationary support, retarding means between the support and drum expansible into frictional engagement with the drum, means between the support and drum for expanding the retarding means, an arm on the opposite side of the support from the drum arranged to operate the expanding means and movable in a generally vertical longitudinal plane from an idle position in which it is outside of the swivelling axis to an active position in which a part is substantially in said axis, and controlling mechanism including a part engaging said part of the arm to rock the arm from idle to active position.

7. Front wheel brake mechanism comprising, in combination, a knuckle rotatably supporting a drum and carrying a stationary support, shoes anchored on the support and expansible into frictional engagement with the inside of the drum, means engaging the free ends of the shoes to expand them against the drum, an arm mounted upon the opposite side of the support from the drum and arranged to operate the expanding means, the arm being arranged to swing in a generally vertical longitudinal plane from a position outside of the swivelling axis to a position in which a part is substantially in said axis, and operating connections including a member engaging said part of the arm to rock the arm from idle to active position.

8. Front wheel brake-mechanism comprising, in combination, a knuckle rotatably supporting a drum and carrying a stationary support, brake-operating mechanism mounted on the support and including a rock shaft journaled in the support and an arm arranged to operate the rock shaft and to be swung from an idle position outside of the swivelling axis to a position in which a part is substantially in said axis, means for adjusting the relative angular positions of the arm and rock shaft, and operating connections including a member engaging said part of the arm to swing the arm from idle to active position.

9. Front wheel brake-operating mechanism comprising, in combination, a swivelled knuckle carrying a stationary support and a brake-operating rock shaft journaled in the support, a crank arm clamped to said rock shaft and arranged for adjustment angularly with respect to the rock shaft, the arm being arranged to be swung from a position outside of the swivelling axis to a position in which a part is substantially in said axis, and operating connections including a member engaging said part of the arm to swing the arm from idle to active position.

10. Front wheel brake-operating mechanism comprising, in combination, a swivelled knuckle carrying a stationary support, a brake-applying shaft journaled in the support, a crank arm adjustably clamped on the end of the shaft and arranged to swing from a position outside of the swivelling axis to a position in which a part is substantially in said axis, and operating connections including a member engaging said part of the arm to swing the arm from an idle to active positon.

11. Front wheel brake mecanism arranged to be varied when rounding a corner and comprising, in combination, a swivelled steering knuckle, retarding means and operating connections swivelling with the knuckle and including a part movable from a position outside of the swivelling axis to a position near but not in said axis, and other operating connections including a member engaging said part to move it to said second position to apply the retarding means when the wheel is moving straight ahead and to vary the pressure on the retarding means when the wheel is swivelled.

12. Braking mechanism for a front wheel arranged to be released when the wheel is on the outside of turn and comprising, in combination, a swivelled knuckle carrying retarding means and operating connections therefor, including a part movable in a direction substantially perpendicular to the swivelling axis from an idle position outside of said axis to an active position near but not in said axis, brake-operating mechanism including a member engaging said part and arranged to move it from idle to active position with the point of engagement so arranged with respect to the swivelling axis that the brake is applied when the wheel is moving straight ahead and is automatically released when the wheel is on the outside of a turn.

13. Braking mechanism for a front wheel arranged to be released when the wheel is swivelling and comprising, in combination, a swivelled knuckle carrying retarding means and operating means therefor, including a part movable approximately perpendicular to the swivelling axis from an idle position outside of said axis to an active position immediately adjacent said axis, brake-applying means including a member swinging in a generally horizontal plane and moving said part from idle to active position, the point of engagement between said part and said member being so arranged with respect to the swivelling axis that the brake is applied when the wheel is moving straight ahead and is automatically released when the wheel is swivelled.

14. Braking mechanism for a front wheel arranged to be released when the wheel is swivelled on a turn and comprising, in combination, a swivelled knuckle rotatably supporting the wheel and carrying retarding means and operating means therefor, including a part movable approximately perpendicular to the swivelling axis from an idle position outside said axis to an active position spaced slightly from said axis approximately in a plane including the swivelling axis and the axis of the wheel, and operating means including a member engaging said part to move it from idle to active position with the point of engagement in said plane so that the brake is applied when the wheel is moving straight ahead and is released when the wheel is swivelled.

15. Braking mechanism for a front wheel comprising, in combination, a swivelled knuckle carrying retarding means and operating connections therefor, including a part movable approximately perpendicular to the swivelling axis from a position outside of said axis to a position immediately adjacent said axis between the axis and the wheel, brake-operating means including a member engaging said part to push it from idle to active position to apply the retarding means when the wheel is straight ahead, said part tending to move away from the member when the wheel is swivelling to release said retarding means.

16. Braking mechanism for a front wheel comprising, in combination, a swivelled knuckle carrying retarding means and operating means therefor, including a part movable substantially horizontally from a position outside of the swivelling axis to a position immediately adjacent said axis between the axis and the wheel, and a lever movable generally horizontally and engaging said part to move it from idle to active position.

17. Braking mechanism for a front wheel comprising, in combination, a swivelled knuckle carrying retarding means and a support, a rock shaft journaled in the support and arranged to operate the retarding means, a movable arm on the rock shaft, and a lever engaging the arm and operable to move the point of engagement generally horizontally from an idle position to an active position between the swivelling axis and the wheel.

18. Braking mechanism for a front wheel comprising, in combination, an axle, a knuckle swivelled to the end of the axle and carrying retarding means and a support, a rock shaft journaled in the support and arranged to operate the retarding means, a movable arm on the rock shaft, and a lever pivoted on the axle and engaging the arm and operable to move the point of engagement generally horizontally from an idle position to an active position between the swivelling axis and the wheel.

19. Retarding means for a wheel rotatably mounted on a knuckle swivelled for steering movement and comprising, in combination, braking mechanism swivelling with the knuckle, and a generally horizontal operating lever engaging a part of said mechanism in such a position with respect to the swivelling axis as to cause the braking pressure to be varied automatically by swivelling the knuckle.

20. Retarding means for a wheel rotatably mounted on a knuckle swivelled for steering movement and comprising, in combination, braking mechanism swivelling with the knuckle, and a generally horizontal operating lever engaging a part of said mechanism between the swivelling axis and the wheel to release the braking mechanism when the wheel and knuckle are swivelled as described.

21. Retarding means for a wheel rotatably mounted on a swivelled knuckle and comprising, in combination, braking mechanism swivelling with the knuckle, and operating means therefor separately supported and engaging a part of the braking mechanism when the latter is in active position approximately in a vertical plane containing the swivelling axis and the wheel axis, the point of engagement moving generally horizontally when the braking mechanism is operated to vary the action as described when the knuckle is swivelled.

22. Retarding means for a wheel rotatably mounted on a swivelled knuckle and comprising, in combination, braking mechanism swivelling with the knuckle, and operating means therefor separately supported, and engaging a part of the braking mechanism when the latter is in active position between the swivelling axis and the wheel, the point of engagement moving generally horizontally to said position when the braking mechanism is operated to vary the action as described when the knuckle is swivelled.

23. Operating mechanism for a brake on a wheel swivelling about a generally vertical axis, including a joint moving crosswise with respect to said axis in applying and releasing the brake, and means for adjusting the position of the joint in a direction substantially perpendicular to said axis to compensate for wear of the brake.

24. Operating mechanism for a brake on a wheel swivelling about a generally vertical axis, including swivelling and non-swivelling parts having interengaging portions moving crosswise with respect to said axis in applying and releasing the brake, and means for adjusting the position of said portions in a direction substantially perpendicular to said axis to compensate for wear of the brake.

In testimony whereof I have hereunto signed my name.

VINCENT BENDIX.